April 14, 1931.  W. L. MANTHA  1,800,946
MARINE GEAR LOCK TRANSMISSION
Filed Feb. 3, 1931  4 Sheets-Sheet 3

INVENTOR.
William L. Mantha.
BY
His ATTORNEYS.

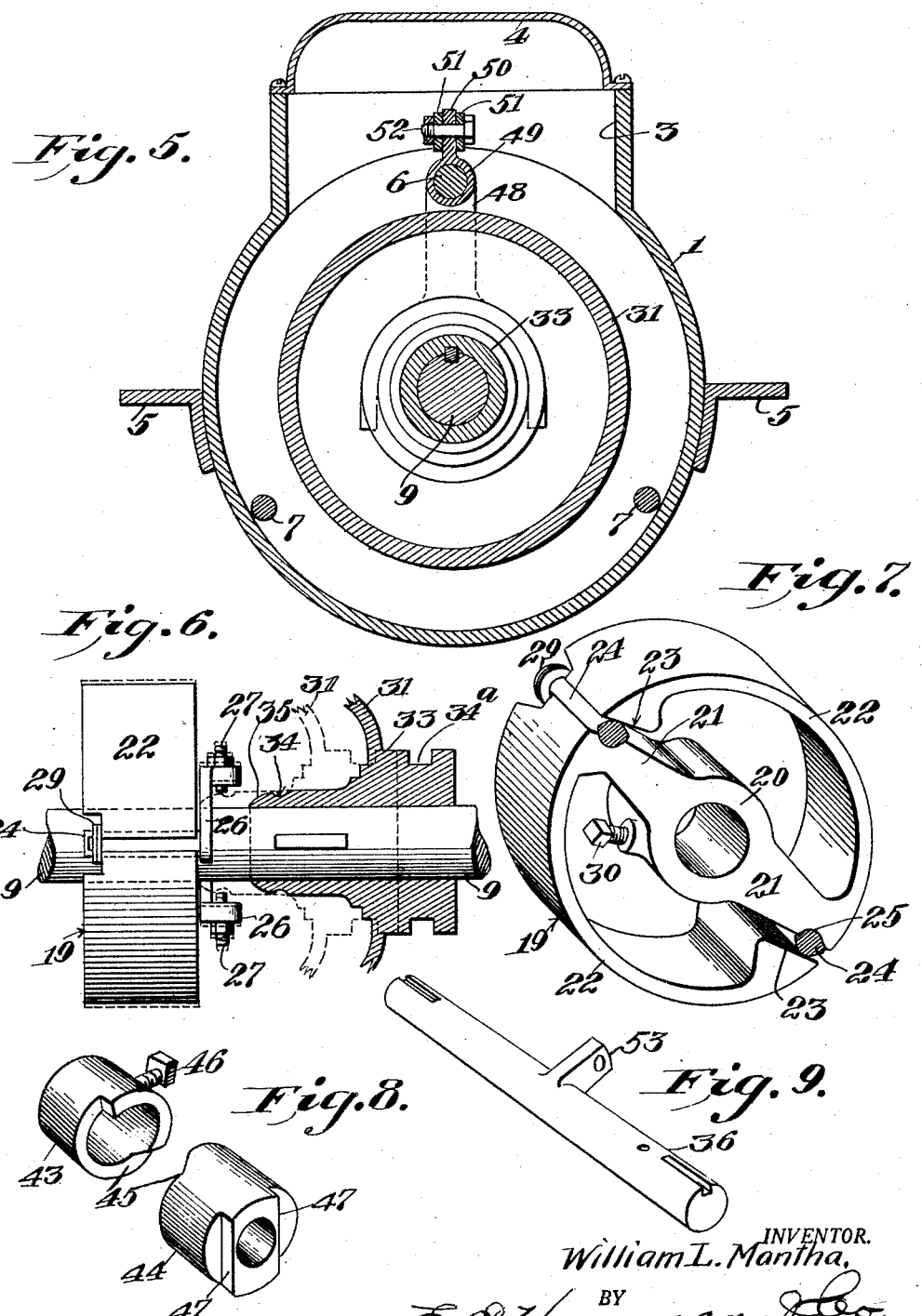

Patented Apr. 14, 1931

1,800,946

UNITED STATES PATENT OFFICE

WILLIAM L. MANTHA, OF BAYPORT, NEW YORK

MARINE GEAR-LOCK TRANSMISSION

Application filed February 3, 1931. Serial No. 513,200.

This invention relates to a marine gear lock transmission.

An object of my invention is the construction of a new and efficient mechanism for causing the driven or tail shaft to revolve one hundred per cent efficient with the front or driving shaft.

Another object of my invention is the construction of a mechanism in which a one hundred per cent action is obtained by certain novel means including a sliding cone which cone is moved forward by a lever resulting in starting the tail shaft revolving, then means on the cone allows dogs of the mechanism to drop back, which releases the clutch band inside to allow the locking device to slide forward and engage itself by meshing the teeth or bosses on the cone and a gear housing, locking the entire unit together, for driving the tail shaft with high efficiency.

With the foregoing and other objects in view, my invention comprises certain novel constructions, combinations and arrangements of parts as will be hereinafter fully described, illustrated in the accompanying drawings and more particularly pointed out in the appended claims.

In the drawings:

Figure 1 is a top plan view of the mechanism, while

Figure 5 is a sectional view taken on line 5—5, Figure 2, and looking in the direction of the arrows.

Figure 6 is a fragmentary view showing partly in plan and partly in section the tail shaft, sliding cone and clutch device.

Figure 7 is a perspective view of the clutch device.

Figure 8 is a perspective view of the cam device.

Figure 9 is a perspective view of the lever shaft.

Figure 1:
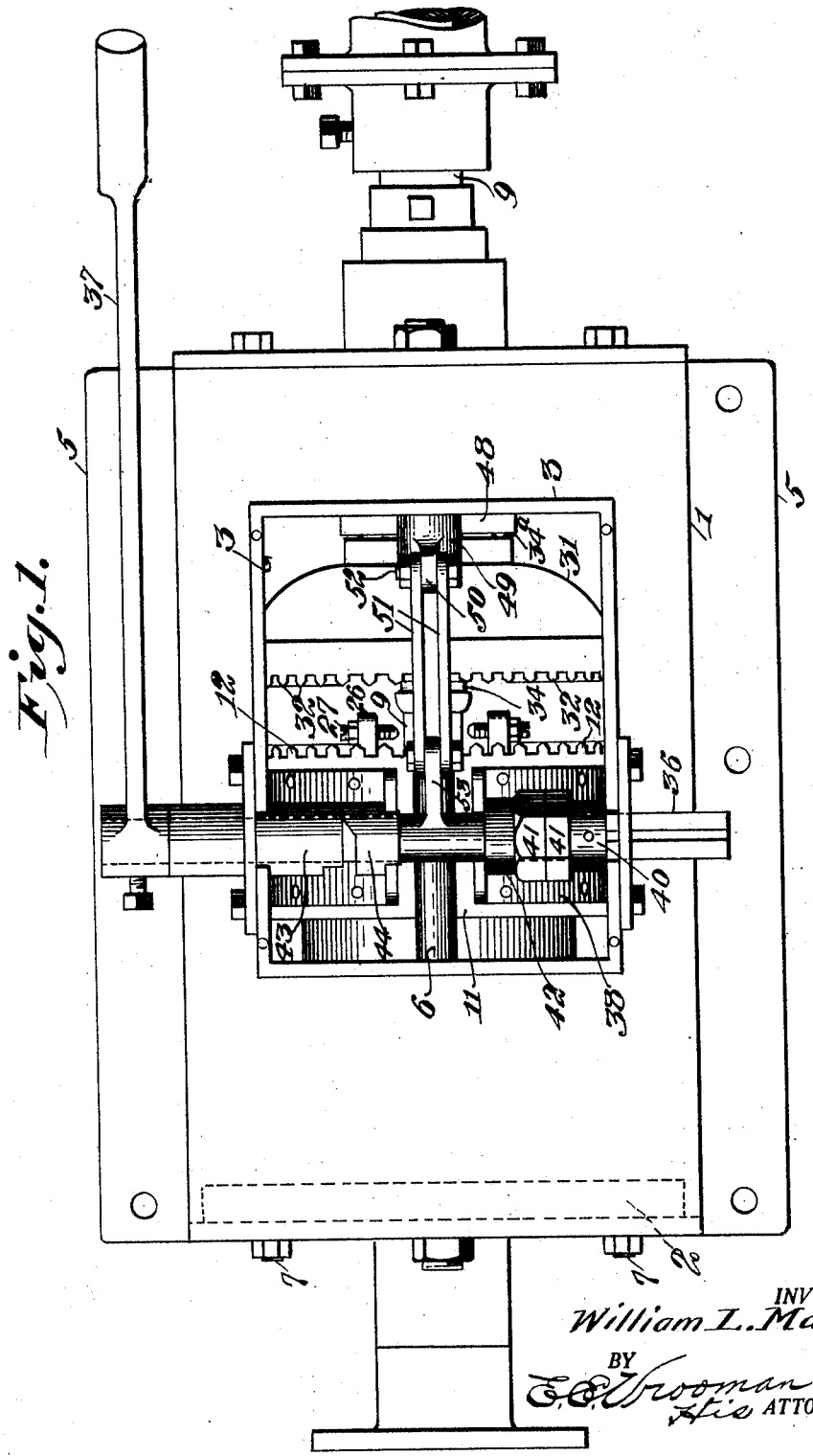

Referring to the drawings by numerals, 1 designates the main casing that is provided with removable ends 2, a top opening 3, which opening 3 is normally closed by a detachable cap 4. The casing 1 is provided upon its sides with brackets 5, 5 that are adapted to engage suitable supports, upon which the mechanism rests.

Figure 2:
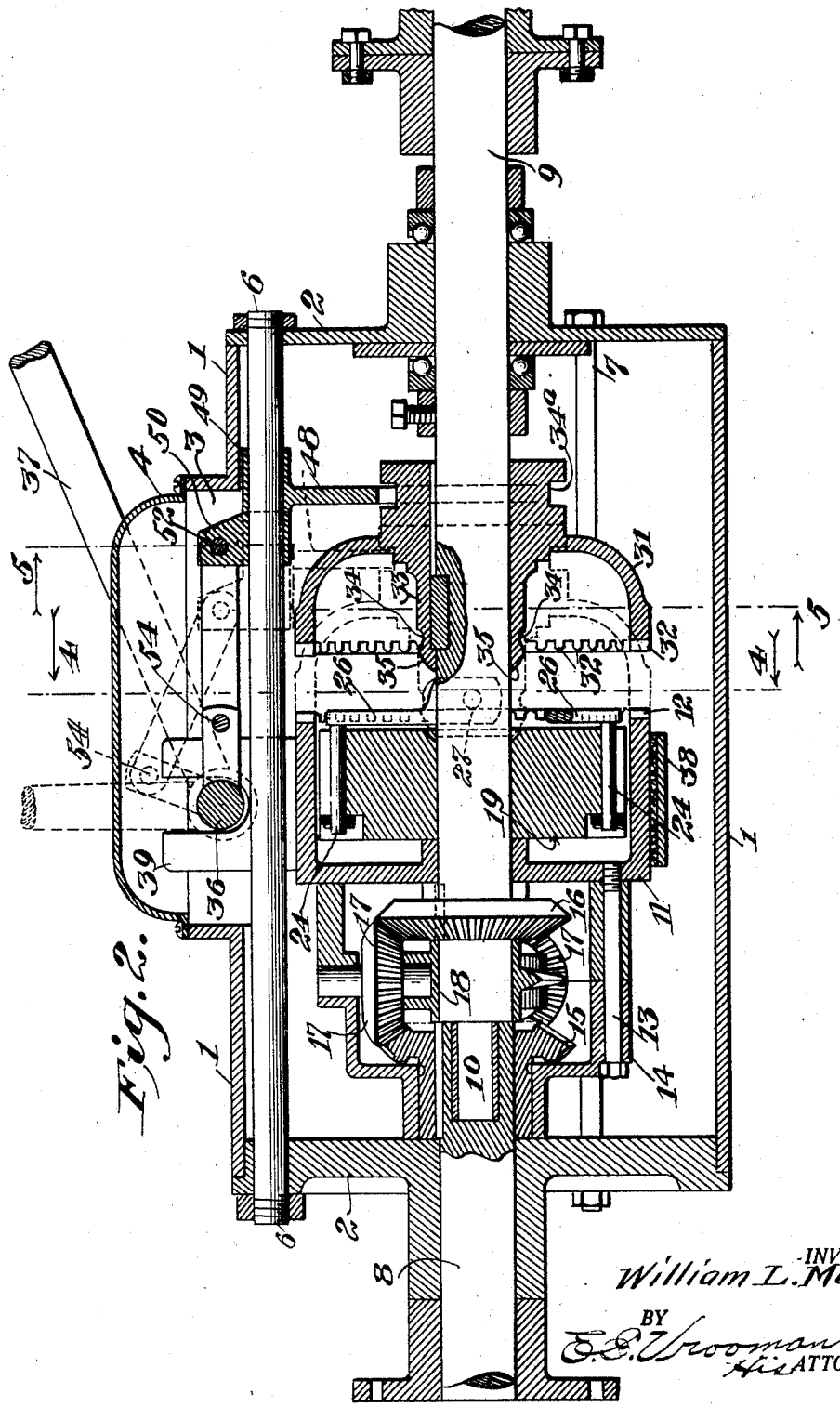
Figure 2 is a longitudinal, vertical, sectional view of the same, as it appears when in a reversed position.
Figure 3:
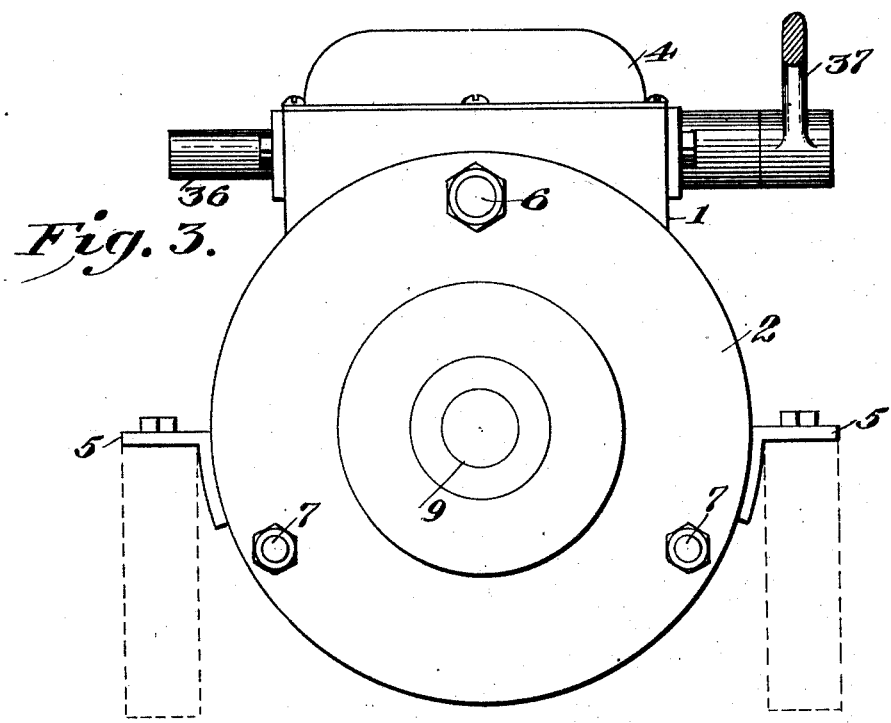
Figure 3 is a view in elevation of the right hand end of the mechanism.

The ends 2, 2 are held in place by a primary bolt 6 and auxiliary bolts 7. The driving shaft 8 extends through one of the ends 2 and the driven or tail shaft 9 extends through the other end of the casing. By means of a suitable extension 10, on tail shaft 9, the two shafts are connected together (Fig. 2).

A gear housing 11 is positioned within the casing 1 and is mounted on tail shaft 9. This housing 11 is provided at one end with gear teeth 12 and attached by bolt 13 is an auxiliary housing 14; this auxiliary housing 14 is fastened to the opposite end of gear housing 11 to that end on which the gear teeth 12 are formed. Keyed on driving shaft 8 is a beveled gear 15 and also keyed on tail shaft 9 is a beveled gear 16; these gears 15 and 16 are positioned within the auxiliary housing 14 (Fig. 2). Three pinion gears 17 are journalled upon the auxiliary housing 14 and sleeve 18, within said housing, and they mesh with said beveled gears 15 and 16.

The clutch device 19 (Fig. 7) comprises a hub 20, two spokes 21 and two clamping or clutch segments 22. The inner end of each clutch segment 22 is integral with the outer end of a spoke 21. The outer end of each clutch segment is enlarged and is flattened at 23, against which cam bolt 24 works. There are two cam bolts 24, each positioned in a socket 25 in one side of spoke 21. Integral with the outer end of each cam bolt 25 is a dog 26. On the outer end of each dog 26 is an adjustable threaded bolt 27. On the outer end of each bolt 27, and normally engaging the dog 26 is a lock nut 28. Suitable fastening means 29 keeps the cam bolts from working off the clutch device. A lock bolt 30 extends through hub 20 and engages tail shaft 9 for locking the clutch device thereon.

A sliding cone 31 is keyed upon shaft 9

(Fig. 2). This sliding cone 31 is provided with gear teeth 32 which are adapted to mesh with the teeth 12 on the gear housing 11. This sliding cone has an integral hub 33. Hub 33 has an annular groove 34 near its inner end and it has a second groove 34ª near its outer end. The inner end of hub 33 is beveled as at 35, over which beveled end the inner ends of bolts 27 pass, and thence move into groove 34 (Fig. 6) for the purpose hereinafter described.

Figure 4:
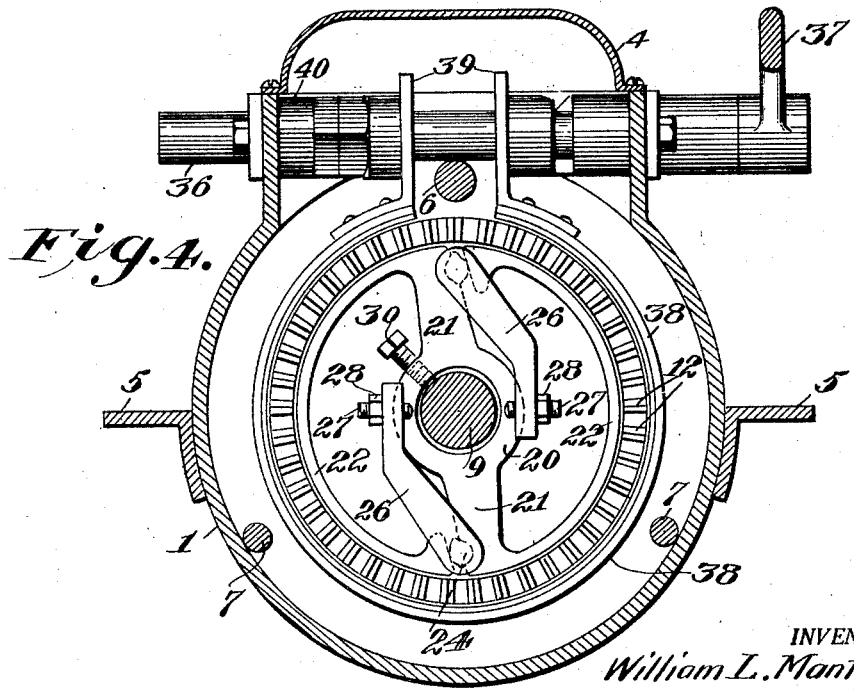
Figure 4 is a sectional view taken on line 4—4, Figure 2, and looking in the direction of the arrows.

A lever shaft 36 is journalled upon casing 1 across opening 3 (Fig. 4). Fastened to one end of shaft 36 is lever 37. A clutch band 38 is positioned around the gear housing 11; this clutch band is provided with bifurcated upstanding ears 39; these ears 39 receive the shaft 36. On shaft 36 is a fixed collar 40 and two adjusting nuts 41; a collar 42 engages one of the ears 39 and one of said adjusting nuts 41. At the opposite side of the ears, and in engagement with one of the same, is the cam device shown in Figure 8. This cam device comprises a primary collar 43 and an auxiliary collar 44. These two collars 43 and 44 are provided with contiguous cam faces 45. A lock bolt 46 on collar 43 holds the collar against independent rotary movement upon shaft 36. The collar 44 is provided with straight shoulders 47, which fit against the inner edges of the bifurcated portion of one of the ears, so that auxiliary collar 44 is locked against rotary movement, whereby when lever 37 rotates shaft 36, the collars 43 and 44 can be brought close together or spread slightly apart by reason of their cam faces 45 for tightly clamping the clutch band 38 upon the gear housing 11, or releasing the band therefrom, as the case may be. The tightness of the clutching action of band 38 can be adjusted to a nicety through the action of the nuts 41 and their collar 42.

A yoke (Fig. 2) is provided with a hub 49, and this hub is slidably mounted upon the primary bolt 6. Hub 49 is provided with an upstanding lug 50 in opening 3. A pair of links 51 are pivotally mounted by bolt 52 on lug 50. Lever 36 is provided near its center with an integral ear 53. Links 51 are positioned at one end against ear 53 and are pivotally connected to the ear by bolt 54. The yoke 48 extends into groove 34ª of the hub 33 of sliding cone 31, whereby movement of the yoke will impart sliding movement to said cone.

When the mechanism is in the position shown in Figures 1 and 2, the clutch band 38 is tightly clamping upon gear housing 11, holding said gear housing stationary, as well as the auxiliary housing 14, thereby causing the three pinion gears 17 to rotate gears 15 and 16 for reversing movement of the tail shaft 9.

When lever 37 is swung upward, the yoke 48 will cause the cone 31 to move towards the gear housing 11, and at the same time the collars of the cam device on shaft 36 close together for "releasing" the clutch band 38 and allowing it to free the gear housing 11. As the sliding cone 31 approaches the gear housing 11, the inner ends of bolts 27 (Fig. 6—see dotted lines) ride up over the beveled end 35, causing the cone to revolve, which revolving, with the motor running slow, permits teeth 12 and 32 to efficiently mesh and as they do, the inner ends of bolts 27 move into the groove 34, releasing the dogs. It is to be understood that to accomplish this temporary rotation of cone 31, prior to its normal meshing position with gear housing, as the bolts 27 ride up on the beveled end 35, the dogs will be swung sufficient for causing the cam bolts 24 to spread apart, so to speak, the clutch segments 22, causing said segments to bind against the inner face of the gear housing 11; hence, through the gear housing 11 and clutch device 19, sufficient rotary movement is imparted temporarily to the hub of cone 31 to speed the cone up, so that its teeth 32 will mesh with the teeth 12 without injury to the same. Then as soon as the teeth do mesh, the clutch device 19 is out of operation. By this operation, I obtain a hundred per cent efficiency in my mechanism.

Therefore, it will be seen that I have provided a specific train of gears in an auxiliary housing for obtaining an efficient action when the mechanism is in reverse. I have also shown and described a specific mechanism for temporary speeding up the sliding cone, prior to its meshing with a gear housing for permanent drive of a hundred per cent efficiency. I have also shown a lever carrying shaft with a novel cam device thereon, co-operating with a clutch band, which band acts upon a gear housing for holding the same stationary when the operator so desires.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a mechanism of the class described, the combination with a casing, of a shaft extending into said casing, a toothed gear housing on said shaft within said casing, a toothed cone provided with a hub slidably mounted on said shaft and adapted to mesh with said gear housing, said hub provided with a bevelled inner end and an annular groove at said bevelled end, means within said gear housing for speeding up the toothed cone, engaging and riding over said bevelled end of the hub and subsequently idling in said annular groove when the teeth of the cone and housing are in mesh, and means for adjusting the toothed cone on said shaft with respect to said gear housing.

2. In a mechanism of the class described, the combination with a casing provided with an opening, of a shaft extending into said casing, a lever shaft journalled upon said casing across said opening, a gear housing in said casing on said first mentioned shaft, a cone on said first mentioned shaft and co-operating with said gear housing, a bolt on said casing, a yoke slidably mounted on said bolt and co-operating with said cone for adjusting the same, means connecting said yoke with said lever shaft whereby when the lever shaft is rotated said yoke will be operated, a clutch band around said gear housing and provided with means straddling said lever shaft, and means on said lever shaft and engaging the straddling portions of said band for clamping the clutch band upon said gear housing or releasing the clutch band therefrom as rotary movement is imparted to said lever shaft.

3. In a mechanism of the class described, the combination with a casing, of a shaft extending into said casing, a gear housing provided on one end with gear teeth and mounted on said shaft within said casing, a sliding cone provided on its inner end with gear teeth mounted on said shaft contiguous to said gear housing, said sliding cone provided with a hub, said hub provided with an inner bevelled end and with an annular groove near said end, a clutch device on said shaft within said gear housing, said clutch device comprising a hub provided with oppositely extending spokes, expansible clutch segments integral at their inner ends with the outer ends of said spokes, each clutch segment provided with a broad outer end having a flat face, each spoke provided with a cam bolt socket opposite to said flat face of a segment, cam bolts in said sockets against said flat faces, dogs integral with the outer ends of said cam bolts, each dog provided on its outer end with an adjustable bolt, said adjustable bolts adapted to have their inner ends ride over the bevelled inner end of said hub and then into said annular groove when the sliding cone is made to approach the gear housing, and manual means co-operating with said sliding cone for moving the same with respect to said gear housing.

4. In a mechanism of the class described, the combination with a casing provided with an opening, of a shaft extending into said casing, a gear housing and a cone on said shaft and co-operating for driving the shaft in one direction, a lever shaft extending across said opening and journalled upon the casing, said lever shaft provided near its center with an ear, means connecting said ear to said cone for moving the cone on the first mentioned shaft when the lever shaft is rotated, adjusting bolts and a collar on said lever shaft, a primary and an auxiliary cam collar on said lever shaft, a clutch band around said gear housing, said clutch band provided with upstanding bifurcated ears, said bifurcated ears straddling said lever shaft, one of said bifurcated ears engaging said first mentioned collar on said lever shaft, said auxiliary cam collar provided on its outer end with straight shoulders, and one of said bifurcated ears engaging said straight shoulders, substantially as shown and described.

5. In a mechanism of the class described, the combination with a casing, of a shaft extending into said casing, a gear housing on said shaft within said casing, a clutch band around said gear housing and provided with upstanding bifurcated ears, a lever shaft in said bifurcated ears and journalled upon said casing, a lever carried by said lever shaft, a cam device at one side of said ears and on said lever shaft, said cam device comprising a primary and an auxiliary collar each provided with a cam on its meeting end, said primary collar provided with means locking the same on said lever shaft, said auxiliary collar provided with means extending into one of the bifurcated ears and locking it and said ear together against independent rotary movement, an adjusting device on said lever shaft against one of said ears, and said adjusting device comprising an outer and an inner collar and with adjusting nuts between said collars, substantially as shown and described.

In testimony whereof I hereunto affix my signature.

WILLIAM L. MANTHA.